(12) United States Patent
Sotoudeh et al.

(10) Patent No.: US 8,470,238 B2
(45) Date of Patent: Jun. 25, 2013

(54) COMPOSITION AND METHOD FOR CONTROLLING COPPER DISCHARGE AND EROSION OF COPPER ALLOYS IN INDUSTRIAL SYSTEMS

(75) Inventors: Kaveh Sotoudeh, Naperville, IL (US); Michael A. Kamrath, Aurora, IL (US); Jasbir S. Gill, Naperville, IL (US)

(73) Assignee: Nalco Company, Naperville, IL (US)

( * ) Notice: Subject to any disclaimer, the term of this patent is extended or adjusted under 35 U.S.C. 154(b) by 244 days.

(21) Appl. No.: 12/274,606

(22) Filed: Nov. 20, 2008

(65) Prior Publication Data

US 2010/0123100 A1     May 20, 2010

(51) Int. Cl.
| | |
|---|---|
| C23F 11/00 | (2006.01) |
| C23F 11/04 | (2006.01) |
| C23F 11/06 | (2006.01) |
| C23F 11/10 | (2006.01) |
| C09K 15/18 | (2006.01) |
| C09K 15/20 | (2006.01) |

(52) U.S. Cl.
USPC ............. 422/16; 252/390; 252/391; 252/392; 106/14.16

(58) Field of Classification Search
USPC ........... 422/16; 252/390, 391, 392; 106/14.16
See application file for complete search history.

(56) References Cited

U.S. PATENT DOCUMENTS

| | | | | |
|---|---|---|---|---|
| 3,843,337 | A | * | 10/1974 | Korpics .......................... 44/343 |
| 3,887,481 | A | | 6/1975 | Korpics |
| 4,234,511 | A | * | 11/1980 | Buckman ........................ 562/14 |
| 4,338,209 | A | * | 7/1982 | Manabe et al. .................. 252/75 |
| 4,374,040 | A | * | 2/1983 | Fenyes et al. ............. 252/389.22 |
| 4,406,811 | A | * | 9/1983 | Christensen et al. ......... 252/180 |
| 4,675,158 | A | * | 6/1987 | Klindera ......................... 422/16 |
| 4,744,950 | A | * | 5/1988 | Hollander ....................... 422/16 |
| 4,873,139 | A | | 10/1989 | Kinosky |
| 5,156,769 | A | * | 10/1992 | Cha et al. ...................... 252/395 |
| 5,217,686 | A | * | 6/1993 | Vanderpool et al. ............ 422/16 |
| 5,219,523 | A | * | 6/1993 | Vanderpool et al. ............ 422/16 |
| 5,236,626 | A | * | 8/1993 | Vanderpool et al. .......... 252/394 |
| 5,746,947 | A | * | 5/1998 | Vanderpool et al. .......... 252/394 |
| 5,772,913 | A | * | 6/1998 | Gill et al. ...................... 252/180 |
| 5,773,627 | A | * | 6/1998 | Anderson et al. ............. 548/257 |
| 5,863,464 | A | * | 1/1999 | Reichgott et al. ............. 252/390 |
| 5,874,026 | A | | 2/1999 | Pilsits, Jr. |
| 2003/0035749 | A1 | * | 2/2003 | Hann et al. ...................... 422/16 |
| 2006/0091354 | A1 | * | 5/2006 | van Ooij et al. ................ 252/70 |
| 2010/0123100 | A1 | * | 5/2010 | Gill et al. ...................... 252/394 |
| 2010/0173071 | A1 | * | 7/2010 | Duke et al. .................... 427/239 |

FOREIGN PATENT DOCUMENTS

CA        2 074 983  A1    3/1993

* cited by examiner

*Primary Examiner* — Joseph D Anthony
(74) *Attorney, Agent, or Firm* — Edward O. Yonter; Andrew D. Sorensen

(57) ABSTRACT

Compositions and methods of using such compositions for reducing copper ion discharge from aqueous systems is disclosed and claimed. The composition includes a synergistic combination of at least two different benzotriazoles or salts thereof that effectively provides an erosion-resistant barrier on copper-containing surfaces of industrial systems.

22 Claims, 1 Drawing Sheet

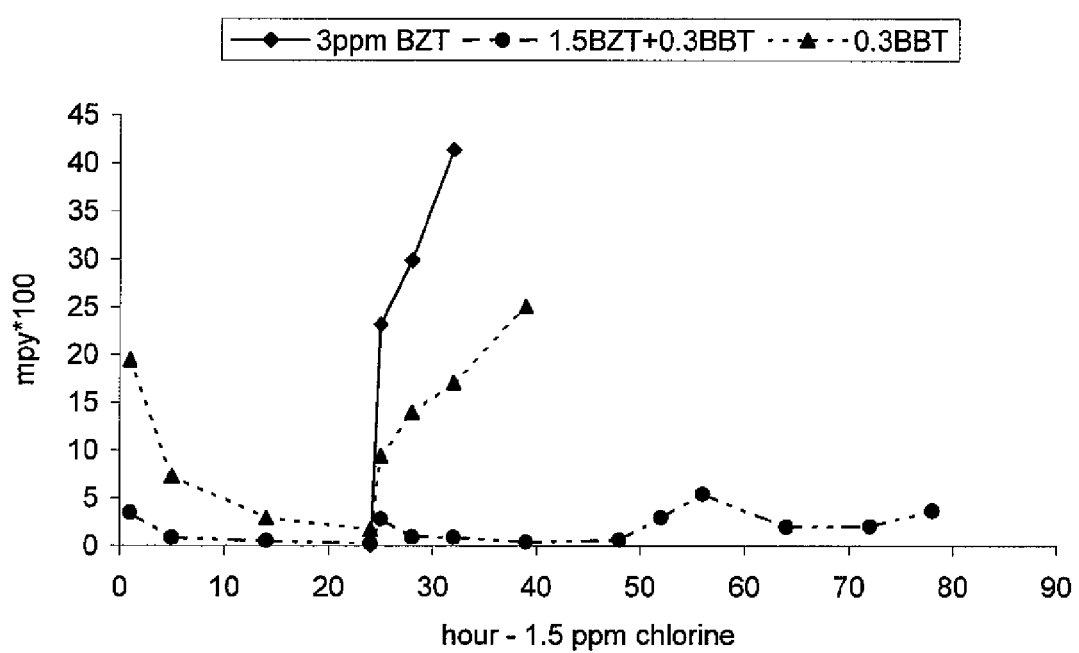

COMPOSITION AND METHOD FOR CONTROLLING COPPER DISCHARGE AND EROSION OF COPPER ALLOYS IN INDUSTRIAL SYSTEMS

TECHNICAL FIELD

This invention relates generally to compositions for reducing erosion and/or corrosion due to aggressive waters in industrial systems. More specifically, the invention relates to reducing erosion and/or corrosion due to high turbidity in industrial systems. The invention has particular relevance to compositions including a synergistic combination of benzotriazoles that creates a tenacious film on copper-containing alloy surfaces and reduces erosion and/or corrosion of such surfaces.

BACKGROUND

Undesirable excess heat is removed in many industrial processes by the use of heat exchangers in which water is used as the heat exchange fluid. Copper and copper-bearing alloys are often used in the fabrication of such heat exchangers, as well as in other parts in contact with the cooling water, such as pump impellers, stators, and valve parts. The cooling fluid is often erosive and/or corrosive towards these metal parts by virtue of the cooling fluid having high turbidity, aggressive ions, and by the intentional introduction of oxidizing biocides for biological control.

The consequences of such erosion and corrosion are the loss of metal from the equipment, leading to failure or requiring expensive maintenance; creation of insoluble corrosion product films on the heat exchange surfaces, leading to decreased heat transfer and subsequent loss of productivity; and discharge of copper ions which can then "plate out" on less noble metal surfaces and cause severe galvanic corrosion, a particularly insidious form of corrosion. Also, since copper is a toxic substance, its discharge to the environment is undesirable. Prevention or at least minimization of such discharge is a great problem in view of increasingly stringent public attitudes and legislation relating to pollution of the environment.

It is common practice to introduce corrosion inhibitors into the cooling water. These materials interact with the metal to directly produce a film which is resistant to corrosion, or to indirectly promote formation of protective films by activating the metal surface so as to form stable oxides or other insoluble salts. However, such films are not completely stable, but rather are constantly degrading under the influence of the aggressive conditions in the cooling water. Because of this effect, a constant supply of corrosion-inhibiting substances must generally be maintained in the cooling water. A constant depletion of such substances occurs because many cooling systems are open, requiring continuous addition of fresh water to compensate for evaporation and blowdown (i.e., discharge). Continuous addition of fresh corrosion-inhibiting substances is likewise required so as to maintain, within defined limits, a concentration of such substances sufficient for the purpose of maintaining good corrosion inhibition. Moreover, currently used materials do not inhibit erosion of the copper-containing surfaces from the effects of particles in high turbidity water in many industrial processes.

Benzotriazole, mercaptobenzothiazole, and tolyltriazole are well known copper corrosion inhibitors. For example, U.S. Pat. No. 4,675,158 discloses the use of tolyltriazole/mercaptobenzothiazole compositions as copper corrosion inhibitors. Also see U.S. Pat. No. 4,744,950, which discloses the use of lower (e.g., $C_3$-$C_6$ linear alkyl, especially n-butyl) alkylbenzotriazoles as corrosion inhibitors and teaches intermittently feeding such compounds to an aqueous system.

U.S. Pat. No. 5,746,947 relates to alkylbenzotriazole compositions comprising a $C_3$-$C_{12}$ alkylbenzo-triazole and a mercaptobenzothiazole, tolyltriazole, benzotriazole, 1-phenyl-5-mercaptotetrazole, and salts thereof for use as corrosion inhibitors. Additionally, these compositions generally provide improved tolerance to oxidizing biocides such as chlorine and bromine. While 5-(lower alkyl)benzotriazoles are known which do not require continuous feeding in order to inhibit copper corrosion (see U.S. Pat. No. 4,744,950), these compounds provide relatively poor performance in the presence of chlorine, and may be ineffective in both dissolved and suspended high-solids waters. U.S. Pat. No. 5,746,947 teaches that depending on water aggressiveness, the time between feedings may range from several days to months.

U.S. Pat. No. 5,236,626 relates to alkoxybenzotriazole compositions comprising a $C_3$-$C_{12}$ alkoxybenzotriazole; and a mercaptobenzothiazole, tolyltriazole, benzotriazole, substituted benzotriazoles such as chlorobenzotriazole, nitrobenzotriazole, etc. and 1-phenyl-5-mercaptotetrazole, and salts thereof for use as corrosion inhibitors. These compositions are effective in high-solids water and form long-lasting protective films on metallic surfaces in contact with aqueous systems. Additionally, these compositions generally provide improved tolerance to oxidizing biocides such as chlorine and bromine.

The above deficiencies are generally overcome by the instant compositions. It is therefore an object of the instant invention to provide erosion inhibitors that also produce more halogen resistant protective films. The inhibitors are further effective in reducing copper discharge into the environment in high-solids, particularly high dissolved solids, aggressive waters.

SUMMARY

This invention accordingly provides a composition for reducing copper ion discharge from an aqueous system, where the aqueous system has a copper-containing surface in contact with the water of the aqueous system. In an aspect, the composition includes a synergistic combination of at least two different benzotriazoles or salts of benzotriazoles. In another aspect, the combination provides an erosion-resistant barrier on the copper-containing surface. In a further aspect, the combination is resistant to degradation by exposure to halogen ions in the water of the aqueous system.

In another aspect, the invention includes a method of reducing copper ion discharge from an aqueous system, where the aqueous system has a copper-containing surface in contact with the water of the aqueous system. The method includes adding to the aqueous system a synergistic combination of at least two different benzotriazoles or salts of benzotriazoles. In a preferred aspect, the method provides an erosion-resistant barrier on the copper-containing surface.

An advantage of the invention is to provide a composition that reduces copper ion discharge from an aqueous system by reducing erosion and/or corrosion of copper-containing alloys in the system.

Another advantage of the invention is to provide a composition that reduces spikes in copper erosion and/or corrosion during oxidizing environment changes including biocide introduction.

A further advantage of the invention is to provide a composition that reduces copper erosion and/or corrosion during system-compromising events including leaks and other system problems.

An additional advantage of the invention is to provide a composition that reduces copper erosion and/or erosion during system events that cause pH fluctuations.

Yet another advantage of the invention is to provide a composition that increases the rate of passivation to copper erosion and/or corrosion after an erosion-inducing or corrosion-inducing factor is removed.

Additional features and advantages are described herein, and will be apparent from, the following Detailed Description, Figures, and Examples.

BRIEF DESCRIPTION OF THE DRAWINGS

FIG. 1 depicts the synergistic effect observed with the composition of the instant invention, as explained in Example 1.

DETAILED DESCRIPTION

"Benzotriazoles" as used herein refers to a class of compounds having the benzotriazole skeleton. Examples of compounds suitable for use in the invention include benzotriazole; mercaptobenzothiazole; tolyltriazole; substituted benzotriazoles, such as chlorobenzotriazole, nitrobenzotriazole, butylbenzotriazole, etc. and 1-phenyl-5-mercaptotetrazole, and salts thereof and the use thereof as corrosion and/or erosion inhibitors, particularly for use in systems having copper and copper alloy components. Additional examples may be found in U.S. Pat. Nos. 5,217,686; 5,219,523; 5,236,626; and 5,746,947 (each incorporated herein by reference in its entirety). These compositions form long-lasting protective films on metallic surfaces; particularly copper and copper alloy surfaces, in contact with aqueous systems, and are especially effective in high-solids water. Additionally, these compositions generally provide improved tolerance to oxidizing biocides including halogens such as chlorine and bromine.

The disclosed compositions are applicable as water treatment additives for industrial cooling water systems, gas scrubber systems, or any water system which is in contact with a metallic surface, particularly surfaces containing copper and/or copper alloys. They can be fed alone or as part of a treatment package either intermittently or continuously. Treatment packages may include, but are not limited to, biocides, scale inhibitors, dispersants, defoamers, and/or other corrosion or erosion inhibitors.

In a preferred embodiment, preparation of the instant compositions occurs by simply blending the constituent compounds. Suitable preparation techniques are well known in the art of water treatment and by suppliers of triazoles. For example, aqueous solutions may be made by blending the solid ingredients with water containing an alkali salt (e.g., sodium hydroxide or potassium hydroxide). Solid mixtures may be made by blending the powders by standard means. Organic solutions may be made by dissolving the solid inhibitors in appropriate organic solvents. Alcohols, glycols, ketones, and aromatics, among others, represent classes of appropriate solvents. The instant method may be practiced by adding the constituent compounds simultaneously (e.g., as a single composition or separate compositions) or by adding them separately, whichever is more convenient. Suitable methods of addition are well known in the art of water treatment. Order-of-addition is not believed to be critical.

While virtually any amount of the disclosed composition aids in preventing copper erosion and/or corrosion, preferred dosages for the composition ranges from about 0.01 ppm to about 500 ppm. More preferably, the dosage is up to about 100 ppm, as a weight-to-weight ratio. An effective amount of the instant alkoxybenzotriazole compositions should be used. As used herein, the term "effective amount" relative to the disclosed compositions refers to that amount of the composition, on an actives basis, which effectively inhibits copper erosion and/or corrosion to the desired degree in a given aqueous system. Preferably, the instant compositions are added at an actives concentration of at least 0.01 ppm, more preferably about 0.1 to about 500 ppm, and most preferably about 0.5 to about 100 ppm, based on the total weight of the water in the aqueous system being treated.

The amount of each benzotriazole relative to the one or more other benzotriazoles is dependent on the particular characteristics of the system and should be determined as needed. These characteristics are generally responsible for the corrosivity of the water system and typically include the amount of corrosive ions such as chloride in the water, high turbidity in the water, high flow velocity of the water, presence or feeding of high dose of oxidants, or process leaks that are common in these systems. For example, in the case of a composition including two benzotriazoles, the ratio, by weight, of each benzotriazole may range from about 0.001:100 to about 100:0.001, preferably from about 0.1:20 to about 20:0.1, and most preferably from about 0.1:10 to about 10:0.1. Ratios ranging from about 1:10 to about 10:1, from about 1:5 to about 5:1, or from about 1:3 to about 3:1 or lower may also be used.

Maximum concentrations of the instant compositions are determined by the operating conditions and economic considerations of the particular application. The maximum economic concentration will generally be determined by the cost of alternative treatments of comparable effectiveness, if comparable treatments are available. Cost factors include, but are not limited to, the total flow through the system being treated, discharge treatment or disposal, inventory, feed-equipment, and monitoring. Minimum concentrations, however, are typically determined by operating conditions such as pH, dissolved solids, suspended solids, and temperature.

The foregoing may be better understood by reference to the following examples, which are intended for illustrative purposes and are not intended to limit the scope of the invention.

Example 1

Corrosion rates were determined by measuring polarization resistance. Cathodic and anodic slopes were determined by Tafel scan. Polarization resistance and cathodic Tafel scans were conducted using a three-electrode electrochemical cell. The potential scans were run using a Gamry Potentiostat/Galvanostat. Working electrode was a copper wire (12.2 cm×0.11 cm) that was polished (using 600 grit SiC paper) before each test. Two steel electrodes functioned as reference and counter electrodes. Both steel electrodes were also polished as above before use.

The test solution was a mix of corrosive water and the candidate copper inhibitor to be evaluated. Corrosive water consisted of: Calcium 200 ppm (as $CaCO_3$); Magnesium 200 ppm (as $CaCO_3$); Chloride 500 ppm; Bicarbonate 40 ppm; and Sulfuric acid was used to maintain pH at 7.3+/−0.3. Test solution was continuously stirred using a magnetic stirrer and its temperature was maintained at 80±2° F. Each test cycle began by exposing the working electrode to the test solution (corrosive water plus inhibitor candidate evaluated) for 24 hours. Chlorine was then added. Chlorine level and pH of the test solutions were adjusted before each subsequent corrosion rate was measured.

The graph in FIG. 1 depicts three different experiments. Each test consisted of two time periods—film formation period and chlorination period. In the film formation period for each sample, the first 24 hours was allotted to copper electrode passivation. In absence of chlorine, the copper electrode was immersed in continuously stirred test solution containing a candidate inhibitor. During the chlorination period, a chlorine (in the form of bleach) slug of 1.5 ppm was added after the initial 24-hour exposure time. Additional chlorine was added to maintain 1.5 ppm free-chlorine before each subsequent corrosion measurements. Upon first addition of 1.5 ppm free-chlorine, the corrosion rate rapidly increased from 0.1 mpy to >20 mpy in the sample having 3 ppm BZT. Subsequent chlorination increased corrosion rate even further. Addition of chlorine to the sample having 0.3 ppm sodium butylbenzotriazole (Na-BBT) induced a similar corrosion response. Higher concentrations of Na-BBT were not tested. Chlorine addition did not lead to a subsequent corrosion rate increase with the sample having a blend of 1.5 ppm benzotriazole (BZT) and 0.3 ppm Na-BBT. A surprising and unexpected synergistic effect was observed with this combination of benzotriazole and butylbenzotriazole.

Example 2

In this Example, treatment with tolyltriazole (TTA) and mixed azole (comprising a 3:1 ratio of TTA to BBT) was performed to illustrate the turbidity resistance of the mixed azole. Treatment was started at a shock level of 10 ppm and subsequently reduced to 1.5 ppm. Dosage was maintained at 3 ppm for the TTA and 0.75 ppm for the mixed azole. A clear advantage was observed when the synergistic mixed azole was exposed to high turbidity waters. Results in Table 1 indicate that the mixed azole treatment was surprisingly and unexpectedly resistant to high turbidity. The amount of copper discharge was substantially reduced when the system was treated with the mixed azole as compared to TTA alone.

TABLE 1

| Treatment | Turbidity (NTU) | Copper Discharge (lbs/day) |
|---|---|---|
| TTA | >1000 | 28.1 |
| TTA | 653 | 15.34 |
| TTA | 533 | 7.16 |
| TTA | 489 | 8.15 |
| Mixed Azole | 300 | 3.05 |
| Mixed Azole | >1000 | 6.44 |
| Mixed Azole | 700 | 3.99 |

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of reducing copper ion discharge from an open aqueous system, the open aqueous system having a copper-containing surface in contact with the water of the open aqueous system, the method comprising:

adding to the open aqueous system a composition comprising a synergistic combination of (i) benzotriazole and/or salt(s) thereof and (ii) a substituted benzotriazole and/or salt(s) thereof, wherein said composition provides an erosion-resistant barrier on the copper-containing surface, and wherein said combination is resistant to degradation by exposure to halogen ions in the water of the open aqueous system and resistant to high turbidity of the open aqueous system, wherein the substituted benzotriazole and/or salt(s) thereof is selected from the group consisting of chlorobenzotriazole and/or salt(s) thereof, and nitrobenzotriazole and/or salt(s) thereof.

2. The method of claim 1, wherein the weight-to-weight ratio of (i):(ii) or (ii):(i) is from about 0.001:100 to about 100:0.001.

3. The method of claim 1, wherein the weight-to-weight ratio of (i):(ii) of (ii):(i) is from about: 0.1:20 to about 20:0.10.

4. The method of claim 1, wherein the weight-to-weight ratio of (i):(ii) or (ii):(i) is from about 0.1:10 to about 10:0.1.

5. The method of claim 1, wherein the weight-to-weight ratio of (i):(ii) or (ii):(i) is from about 1:10 to about 10:1.

6. The method of claim 1, wherein the weight-to-weight ratio of (i):(ii) or (ii):(i) is from about 1:5 to about 5:1.

7. The method of claim 1, wherein the weight-to-weight ratio of (i):(ii) or (ii):(i) is from about 1:3 to about 3:1.

8. The method of claim 1, including adding at least about 0.01 ppm of the composition, based on the total weight of the water in the open aqueous system being treated.

9. The method of claim 1, including adding from about 0:1 to about 500 ppm of the composition, based on the total weight of the water in the open aqueous system being treated.

10. The method of claim 1, including adding from about 0.5 to about 100 ppm of the composition, based on the total weight of the water in the open aqueous system being treated.

11. The method of claim 1, wherein the weight-to-weight ratio of (i):(ii) or (ii):(i) is from about 0.5:99.5 to about 99.5:0.5.

12. A method of reducing copper ion discharge from an open aqueous system, the open aqueous system having a copper-containing surface in contact with the water of the open aqueous system, the method comprising:

adding to the open aqueous system a composition comprising a synergistic combination of (i) tolyltriazole and/or salt(s) thereof and (ii) a substituted benzotriazole and/or salt(s) thereof, wherein said composition provides an erosion-resistant barrier on the copper-containing surface, and wherein said combination is resistant to degradation by exposure to halogen ions in the water of the open aqueous system and resistant to high turbidity of the open aqueous system;

wherein the substituted benzotriazole and/or salt(s) thereof is selected from the group consisting of chlorobenzotriazole and/or salt(s) thereof, and nitrobenzotriazole and/or salt(s) thereof.

13. The method of claim 12, including adding at least about 0.01 ppm of the composition, based on the total weight of the water in the open aqueous system being treated.

14. The method of claim 12, including adding from about 0.1 to about 500 ppm of the composition, based on the total weight of the water in the open aqueous system being treated.

15. The method of claim 12, including adding from about 0.5 to about 100 ppm of the composition, based on the total weight of the water in the open aqueous system being treated.

16. The method of claim 12, wherein the weight-to-weight ratio of (i):(ii) or (ii):(i) is from about 0.5:99.5 to about 99.5:0.5.

17. The method of claim 12, wherein the weight-to-weight ratio of (i):(ii) or (ii):(i) is from about 0.001:100 to about 100:0.001.

18. The method of claim 12, wherein the weight-to-weight ratio of (i):(ii) or (ii):(i) is from about 0.1:20 to about 20:0.10.

19. The method of claim 12, wherein the weight-to-weight ratio of (i):(ii) or (ii):(i) is from about 0.1:10 to about 10:0.1.

20. The method of claim 12, wherein the weight-to-weight ratio of (i):(ii) or (ii):(i) is from about 1:10 to about 10:1.

21. The method of claim 12, wherein the weight-to-weight ratio of (i):(ii) or (ii):(i) is from about 1:5 to about 5:1.

22. The method of claim 12, wherein the weight-to-weight ratio of (i):(ii) or (ii):(i) is from about 1:3 to about 3:1.

* * * * *